Oct. 7, 1941.   P. MAGRINI   2,258,118

MANUFACTURE OF SHEET GLASS

Filed May 9, 1938

INVENTOR
Pete Magrini

Patented Oct. 7, 1941

2,258,118

UNITED STATES PATENT OFFICE 2,258,118

MANUFACTURE OF SHEET GLASS

Pete Magrini, Belle Vernon, Pa., assignor to American Window Glass Company, Pittsburgh, Pa., a corporation of Pennsylvania Application May 9, 1938, Serial No. 206,725

2 Claims. (Cl. 49—17)

The present invention relates broadly to the manufacture of sheet glass and more particularly to improved apparatus therefor.

Heretofore in the manufacture of drawn or sheet glass considerable difficulty has been experienced by virtue of the presence in the finished product of waves and batter. These defects have been characteristic of drawn glass and although many attempts have been made heretofore to obviate these defects none of the prior attempts have been successful. However, in my copending application Serial No. 205,959, filed May 4, 1938, I have shown and described a method and apparatus whereby such waves and batter can be very materially reduced or substantially eliminated from the drawn glass. The product of the invention disclosed in said application is substantially free of such defects and hence objects viewed through such glass are not appreciably distorted.

The present invention relates generally to the invention claimed in said co-pending application. The present invention, however, is specifically concerned with the elimination of one of the contributing causes of waves and batter. The flow of air beneath the coolers and the debiteuse or the molten bath of glass has a definite effect upon the character of the finished glass sheet. I have found that by preventing ingress of air beneath the coolers to the area adjacent the meniscus and the egress of air from the space adjacent the meniscus outwardly beneath the coolers it is possible to reduce the defects above mentioned in the finished product. The prevention of the outward flow of air from adjacent the meniscus is particularly important where a transverse flow of air or other gas is provided along the meniscus of the rising glass sheet from one edge to the other edge thereof.

In accordance with the present invention I propose to seal off the area beneath the coolers by the provision of a shield secured to the base of each cooler and extending between the cooler and the debiteuse and longitudinally throughout substantially the length of the cooler. I preferably employ a shield in the form of a pipe having both of its ends open, the pipe being welded or otherwise secured to the base of the cooler. Such a shield has advantages over other types of shields which may be employed in that it is readily movable toward or away from the rising glass sheet with the coolers and may be removed from the pit with the coolers. Furthermore it can be utilized for partially supporting the coolers.

In the accompanying drawing I have shown for purposes of illustration only the preferred form of shield mentioned above. It will be understood, however, that I do not intend that my invention shall be limited to this specific form.

Figure 1:
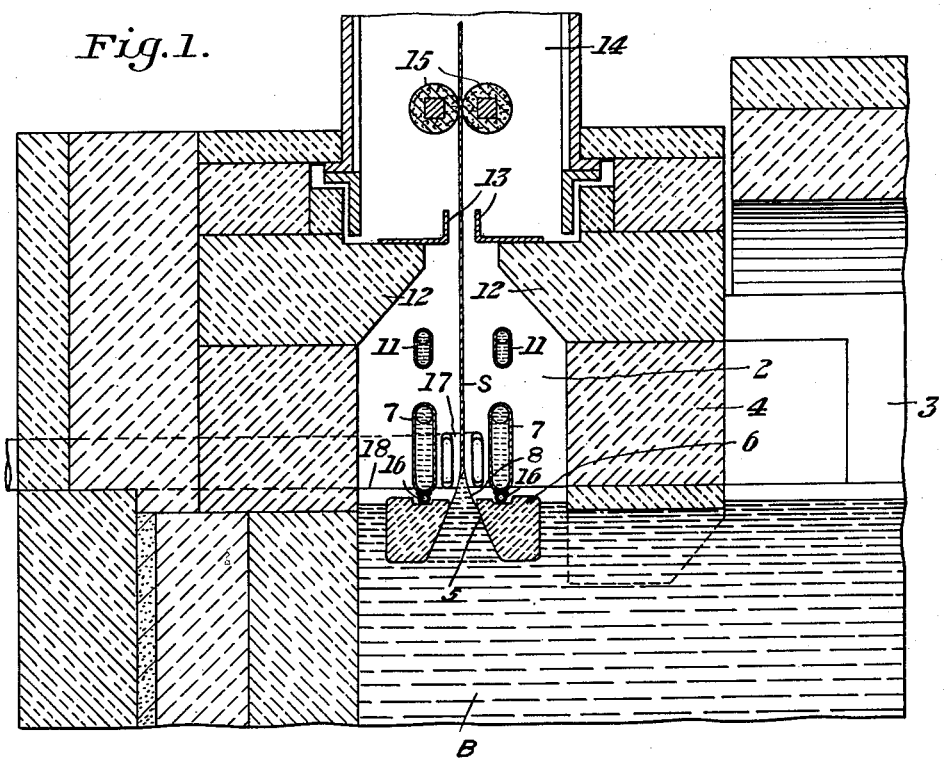
Figure 1 is a partial transverse section through a drawing pit and a portion of the canal leading thereto.
Figure 2:
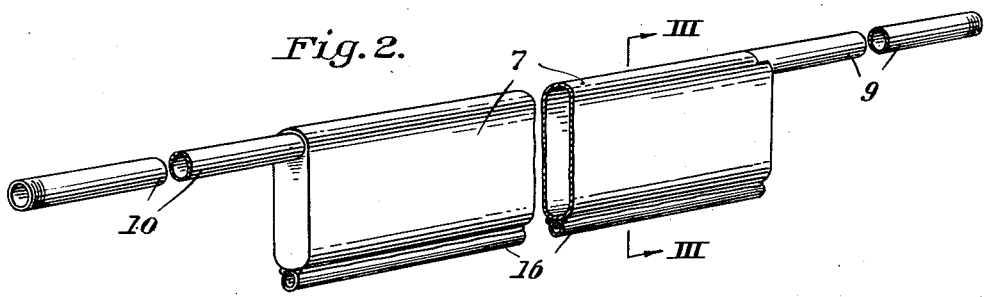
Figure 2 is a perspective view of one of the coolers shown in Figure 1.
Figure 3:
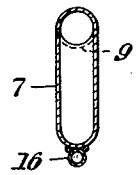
Figure 3 is a section taken along the line III—III of Figure 2.

As shown in the drawing the molten glass in the bath B in the drawing pit 2 is fed thereto from the canal 3 beneath the bridge wall 4 which separates the drawing pit 2 from the canal. The glass sheet S is drawn vertically from the bath B through the slot 5 in the debiteuse 6. The glass sheet continues upwardly between the main coolers 7 which are positioned on opposite faces of the glass sheet adjacent the meniscus 8 and which extend longitudinally throughout the width of the rising glass sheet. These coolers are provided with inlet pipes 9 and outlet pipes 10 for feeding cooling fluid to and discharging it from the coolers. The glass sheet then continues vertically between similar auxiliary coolers 11 positioned on opposite faces of the rising glass sheet and passes between the so-called 49-blocks 12, between the angles 13 into the lehr 14 which, as is well understood in the art, is provided with a plurality of glass supporting rolls 15.

The coolers 7 are necessarily positioned above the debiteuse 6. It is necessary to space them above the debiteuse because if they were positioned on the debiteuse so as to themselves prevent the flow of air between the coolers and the debiteuse they would cool the debiteuse to a sufficient extent to detrimentally affect the drawing operation. Accordingly I shield this area between the coolers and the debiteuse by the provision of a pipe 16 on the base of each cooler extending longitudinally throughout the entire length of the cooler. This pipe is preferably hollow and the ends thereof are preferably open so as to permit the free passage of air therethrough. Each pipe 16 is suitably secured to the base of a cooler by welding or brazing or any other suitable method. However, it is necessary to have a substantially uniform weld throughout the entire length of the cooler or otherwise the irregularity of the weld will show up in the drawn glass sheet in the form of thick and thin portions. These pipes rest directly on the debiteuse in apparatus of the character shown in the drawing or if no floater or debiteuse of this character is utilized the pipes may rest directly on the glass bath.

In the apparatus shown in the drawing a tunnel 17 is provided at each end of the drawing pit and these tunnels rest on the breast wall 18 and have one end within the furnace adjacent the meniscus of the rising glass sheet and one end outside the furnace so as to provide for the introduction of air to the pit adjacent the meniscus and for providing for the transverse flow of such air or other gas along the meniscus from one edge of the rising glass sheet to the other edge thereof.

The pipe shields described above are of particular advantage in apparatus of this character as they not only prevent the ingress of air to the area adjacent the meniscus beneath the coolers but they also prevent the egress of air from the area adjacent the meniscus beneath the coolers. However, where transverse circulation of the above character is not utilized the shields provided by my invention are advantageous in that they eliminate the inward flow of air beneath the coolers.

While I have shown and described a preferred embodiment of my invention it will be understood that my invention may be otherwise embodied within the scope of the appended claims.

I claim:

1. Apparatus for drawing sheet glass comprising a drawing pit having a bath of molten glass therein, a debiteuse at the surface of the glass in said pit, said debiteuse having a longitudinal slot therein through which the glass is drawn, means for drawing a sheet of glass upward from said slot, a longitudinally extending cooler spaced above said debiteuse and adjacent to and parallel with each face of the rising glass sheet, a shield secured to the base of each cooler and extending between the cooler and the debiteuse and longitudinally throughout substantially the length of the cooler, and means including a conduit extending into said pit for circulating a gas in contact with and in the same direction along each face of the rising glass sheet from one edge to the other edge thereof adjacent the meniscus between the coolers and the glass sheet.

2. Apparatus for drawing sheet glass comprising a drawing pit having a bath of molten glass therein, means for drawing a sheet of glass vertically from said bath, including a debiteuse having a longitudinal slot through which the glass is drawn and a longitudinally extending cooler spaced above the debiteuse and adjacent to and parallel with each face of the rising glass sheet, means for circulating a gas transversely of the rising glass sheet and in contact with each face thereof from one edge to the outer edge thereof adjacent the meniscus, and a shield attached to each cooler and extending downwardly therefrom for preventing flow of gas outwardly or inwardly beneath the cooler.

PETE MAGRINI.